US008061940B2

(12) United States Patent  (10) Patent No.: US 8,061,940 B2
Prust et al.                (45) Date of Patent:     Nov. 22, 2011

(54) SPINDLE UNIT COMPRISING A WORKING SPINDLE THAT CAN BE REPOSITIONED WHEN IN OPERATION

(75) Inventors: Dirk Prust, Tuttlingen (DE); Hans-Henning Winkler, Tuttlingen (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 383 days.

(21) Appl. No.: 12/338,911

(22) Filed: Dec. 18, 2008

(65) Prior Publication Data

US 2009/0162161 A1   Jun. 25, 2009

Related U.S. Application Data

(63) Continuation of application No. PCT/EP2007/004527, filed on May 22, 2007.

(30) Foreign Application Priority Data

Jun. 19, 2006   (DE) .......................... 10 2006 028 972

(51) Int. Cl.
     *B23C 1/12* (2006.01)
(52) U.S. Cl. ........................................ 409/231; 409/239
(58) Field of Classification Search ................. 409/231, 409/239, 193, 207–209, 199–200; 408/150, 408/151
     See application file for complete search history.

(56) References Cited

U.S. PATENT DOCUMENTS

| 2,434,639 | A | * | 1/1948 | Bugatti | 409/231 |
| 3,211,025 | A | * | 10/1965 | Mottu | 408/13 |
| 3,221,605 | A | * | 12/1965 | Hemmerle, Jr. | 409/239 |
| 5,544,989 | A | * | 8/1996 | Erath | 408/153 |
| 5,833,408 | A | * | 11/1998 | Buck | 409/132 |
| 6,877,936 | B2 | * | 4/2005 | Linderholm et al. | 408/1 R |
| 7,258,514 | B2 | | 8/2007 | Bauer et al. | |
| 2005/0188798 | A1 | * | 9/2005 | Bischof et al. | 82/1.11 |

FOREIGN PATENT DOCUMENTS

| DE | 1 112 871 | | 2/1956 |
| DE | 34 868 | | 12/1964 |
| DE | 43 24 918 | | 2/1994 |
| DE | 43 33 196 | | 4/1994 |
| DE | 198 59 360 | | 7/2000 |
| DE | 102 33 253 | | 2/2004 |
| DE | 103 29 402 | | 1/2005 |
| DE | 103 43 320 | | 4/2005 |
| EP | 791423 A1 | * | 8/1997 |
| GB | 1 281 939 | | 7/1972 |
| JP | 61152304 A | * | 7/1986 |
| JP | 02053507 A | * | 2/1990 |
| JP | 2000141115 A | * | 5/2000 |
| WO | WO-02/21004 | | 3/2002 |
| WO | WO-2005/000507 | | 1/2005 |

OTHER PUBLICATIONS

International Search Report for PCT/EP2007/004527, mailed on Aug. 17, 2007, 3 pages.
International Preliminary Report on Patentability for PCT/EP2007/004527, issued on Jan. 13, 2009, 5 pages.
Written Opinion for PCT/EP2007/004527, issued on Jan. 13, 2009, 4 pages.

* cited by examiner

*Primary Examiner* — Daniel Howell
(74) *Attorney, Agent, or Firm* — Morrison & Foerster LLP

(57) ABSTRACT

A spindle unit has a working spindle, which is mounted, so as to be rotatable about its longitudinal axis, in its own bearing housing and in which there is provided a receiver for tools for machining workpieces. Via a repositioning unit, the working spindle is repositioned automatically and controllably in relation to the bearing housing when in operation (FIG. 1).

19 Claims, 5 Drawing Sheets

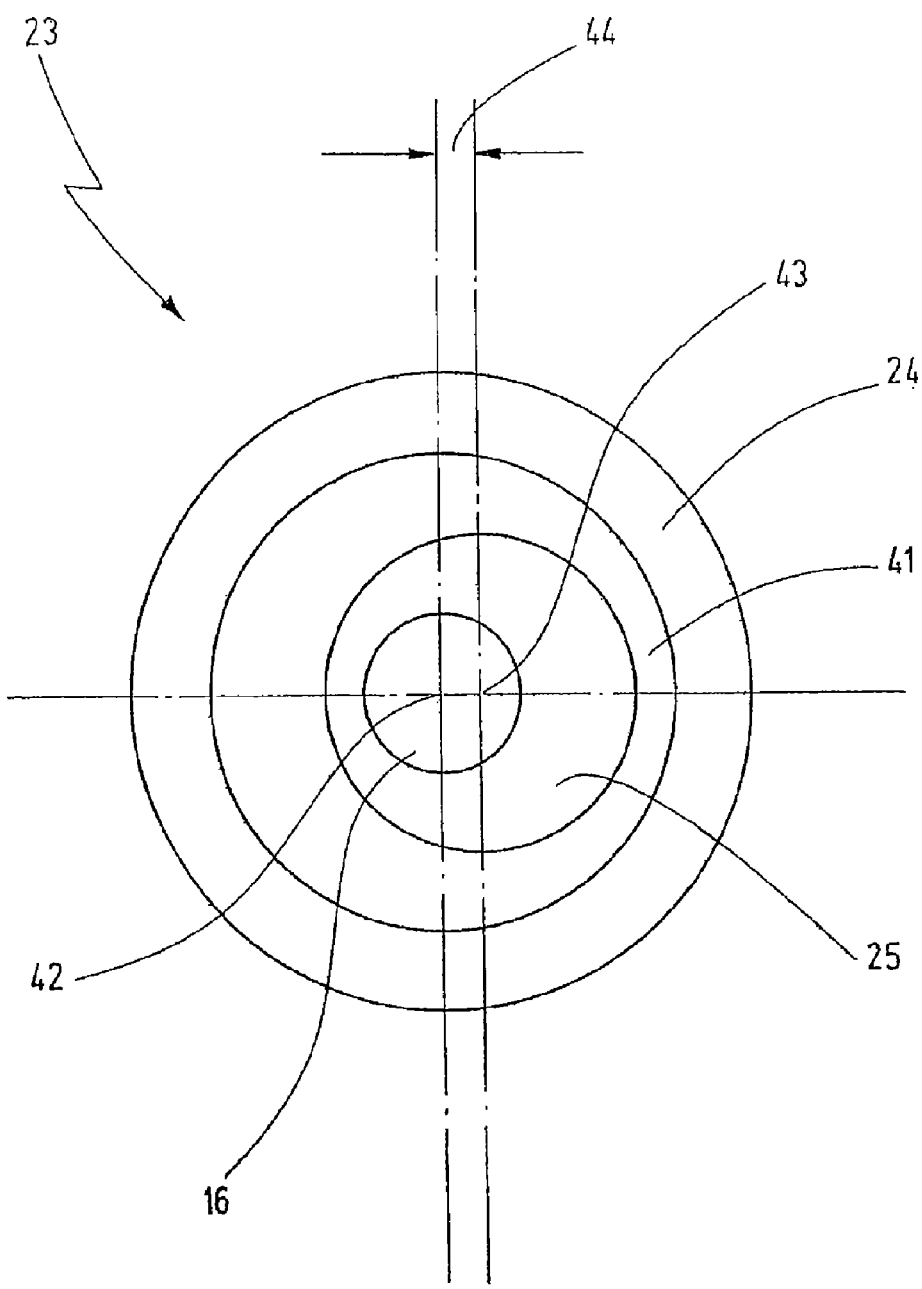
Fig.4
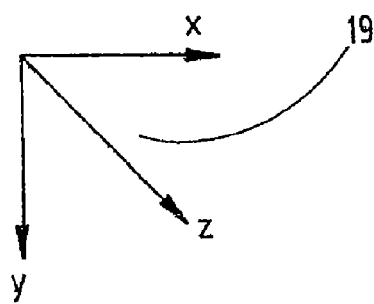

SPINDLE UNIT COMPRISING A WORKING SPINDLE THAT CAN BE REPOSITIONED WHEN IN OPERATION

CROSS-REFERENCE TO RELATED APPLICATIONS

This is a continuation application of international patent application PCT/EP 2007/004527, filed May 22, 2007, designating the United States and published in German as WO 2007/147471 A1, which claims priority to German application No. 10 2006 028 972.2, filed Jun. 19, 2006. The contents of these documents are incorporated herein by reference in their entirety.

BACKGROUND OF THE INVENTION

1. Field of the Invention

The present invention relates to a spindle unit comprising a working spindle, which is mounted, so as to be rotatable about its longitudinal axis, in its own bearing housing and in which there is provided a receiver for tools for machining workpieces, and to a machine tool comprising at least one such spindle unit.

2. Related Prior Art

A multiplicity of such spindle units and machine tools are known in the prior art.

The known spindle units are used individually or multiply in the known machine tools for the purpose of, for example, chip-removing machining of workpieces. These machine tools have one, two or more working spindles, each of which is mounted in its own bearing housing, also termed spindle housing, the spindle housing or housings being arranged fixedly on a spindle carrier, also termed spindle head.

The spindle head can be moved in three orthogonal axes, designated as the X-axis, Y-axis and Z-axis, relative to a workpiece table, onto which workpieces to be machined can be clamped, in so-termed fixtures. Frequently, yet further relative movements are possible between the working spindle and the workpiece. Thus, in some applications, the spindle head is pivotally mounted, yet further axes also being able to be arranged in the workpiece, which, for this purpose, is held in a fixture that is, for example, rotatable or pivotable.

Whereas such machine tools can be controlled well in respect of control technology, there is nevertheless the requirement for yet ever more rapid workpiece machining, to enable a greater number of workpieces to be machined per unit of time.

This requirement is met, on the one hand, by ever more rapid relative movement capability between the spindle head and the workpiece table. Owing to the large masses to be moved and the therewith associated forces of acceleration, increasing of the travel speed is nevertheless subject to limits if the accuracy and reproducibility of the machining within a workpiece and between workpieces machined in chronological succession by one and the same working spindle are not to be adversely affected.

On the other hand, however, the throughput can also be increased through the use of multispindle machines.

In the case of such multispindle machines, a plurality of workpieces, corresponding to the number of spindles, can be machined synchronously and simultaneously by means of a tool inserted, respectively, in the respective working spindle. The working spindles, and consequently also the tools, are moved synchronously in the three axes of the coordinate system, such that identical machining operations are performed on the workpieces. The throughput of workpieces per machine tool can thereby be increased significantly.

The multispindle machines, however, exhibit problems in respect of accuracy, which ensue from their design. Since the tools cannot be moved separately from one another, it is crucial for the accuracy and reproducibility of the workpiece machining that the spacing of the axes of rotation of the working spindles, and consequently the spacing of the longitudinal axes of the tools, in relation to one another corresponds exactly to the spacing of the tools in relation to one another. This can be achieved in that the fixtures clamping the workpieces are mounted on the workpiece table, and if necessary readjusted, in such a way that they have a center-to-center spacing in relation to one another that corresponds to the spacing of the longitudinal axes of the workpieces and/or to the position of the longitudinal axes perpendicular to this spacing.

Likewise, it is important that the tools have an identical position in the direction of their longitudinal axis, i.e., usually in the direction of the Z-axis in the case of traveling-column machines, such that, for example, they can drive bores of equal depth into the workpieces. It is therefore detrimental to the accuracy and reproducibility, both between workpieces machined simultaneously in parallel and between workpieces machined in chronological succession, if the tools differ in length. This must be taken into account in clamping the tool into the respective tool holder via which the tool is clamped into the receiver in the respective working spindle. In this way, there are always held ready in the corresponding tool magazine sets of tools that match one another in respect of their length. Nevertheless, it is possible for the tools to have differing lengths as a result of differing wear, which then results in machining inaccuracies.

A further source of error in the case of such double-spindle or multispindle machines ensues as a result of thermally caused changes in the position both of the bearing housings in relation to one another and of the fixtures in relation to one another or to the bearing housings. In the course of operation, such machine tools usually become heated, which results in the spacing between the bearing housings, and consequently the working spindles, being increased. Likewise, it is possible for the working spindles to become displaced relative to one another in the Z direction, since the thermal deflections have differing effects upon the different bearing housings. In addition to the displacement caused by the increasing self-heating of the machine tool, such thermal deflections also ensue in the course of the day as a result of, for example, increasing insulation.

Although the temperature changes also affect the spacing of the fixtures in relation to one another, the temperature sensitivity of the workpiece table differs significantly from the temperature sensitivity of the spindle carrier, such that the thermal deflections displace the fixtures in a manner that differs from that in which they displace the bearing housings. A further problem consists in that fixtures are also frequently exchanged during the operation of a machine tool, it being the case that the center-to-center spacing of the newly exchanged-in fixtures can differ from the center-to-center spacing of the fixtures previously in use. This then means that it is necessary for the position of the workpieces, and consequently the position of the fixtures, in relation to one another to be altered and adapted to the position of the working spindles in order for the wanted precision to be ensured in the parallel machining of two or more workpieces. This is very laborious and time-consuming.

Overall, this means that, in the case of machine tools of the type mentioned at the beginning, it is desirable to be able to adjust, i.e., correct, the position of the working spindles in relation to one another in the course of operation, for example in order to compensate the abovementioned thermal deflections.

There are known in the prior art various methods by which the position of the bearing housings can be readjusted in relation to one another in the case of double-spindle or multispindle machines.

DE 103 29 402 A1 describes a machine tool in which the bearing housings are mounted in eccentric bushes, via which the bearing housings can be repositioned, axially parallelwise relative to a central shaft.

DE 198 59 360 A1 describes a machine tool in which the spacing between two bearing housings can be altered by piezoelectric positioning elements, as a result of which the relative position of the bearing housings in relation to one another can be shifted in an axially parallel manner or, also, tilted.

A similar design is disclosed by DE 103 43 320 A1. Here, however, a rib is provided as a positioning element between the bearing housings, the temperature of which rib can be raised or lowered by means of a thermal apparatus for the purpose of thus modifying its length and thereby influencing the relative position of the bearing housings in relation to one another.

DD 34 868 A describes a multispindle drilling head for drilling bores arranged centrosymmetrically on a hole circle. The drilling head has a series of spindle units mounted eccentrically on a spindle carrier, which, in turn, is rotatably mounted in the drilling head. Rotation of the spindle carrier alters the radial spacing between the respective spindle unit and the center of the drilling head, and the circumferential spacing between the individual spindle units.

In the case of all of these machine toots, it has been found to be disadvantageous that the positioning elements do not operate sufficiently rapidly, or affect the accuracy of the machining in an unwanted manner. Further, the repositioning paths are frequently insufficient.

SUMMARY OF THE INVENTION

In view of the above, an object of the present invention is to develop the machine tool and spindle unit mentioned at the outset in such a way that it is possible for the working spindle to be repositioned in a rapid, reproducible and easily controllable manner, with an adequate repositioning path.

In case of the spindle unit and machine tool mentioned at the outset, this and other objects are achieved, according to a first aspect of the invention, in that the working spindle comprises:

a working spindle,
a bearing housing, said working spindle being mounted, so as to be rotatable about its longitudinal axis, in its own bearing housing,
a receiver for tools for machining workpieces, said receiver being provided in the working spindle, and
a repositioning unit, in order for the working spindle to be repositioned automatically and controllably in relation to the bearing housing when in operation,
wherein the working spindle is mounted so as to be tiltable in its bearing housing.

According to a second aspect of the invention the spindle unit comprises:

a working spindle,
a bearing housing, said working spindle being mounted, so as to be rotatable about its longitudinal axis, in its own bearing housing,
a receiver for tools for machining workpieces, said receiver being provided in the working spindle, and
a repositioning unit, in order for the working spindle to be repositioned automatically and controllably in relation to the bearing housing when in operation, wherein the working spindle is mounted, at its lower or upper end, in the assigned bearing housing via a first bearing that can be repositioned transversely relative to the longitudinal direction by means of a positioning motor.

The object on which the invention is based is thereby achieved in full.

This is because the inventors of the present application have perceived that, in the case of the known spindle units and machine tools, a problem consists in that the entire spindle unit is repositioned in each case, i.e., that the bearing housings are moved and, in the case of the multispindle machines, are adjusted and repositioned relative to one another. This means, on the one hand, that it is necessary for relatively heavy units to be repositioned or moved, which can be achieved only with relatively large forces. On the other hand, the reaction times of the known positioning devices are very slow, not only on account of the large forces, but also on account of the nature of the respective repositioning.

According to the perception of the inventors of the present application, all of these disadvantages can be avoided if the working spindle is mounted so as to be repositionable in its bearing housing, such that the working spindles can be repositioned when in operation, as it were, in order to correct the relative alignment of the individual working spindles in relation to one another, or to reposition the working spindles relative to the bearing housing.

It is thereby now possible, on the one hand, for a plurality of working spindles to be adjusted rapidly relative to one another, for the purpose of automatically taking account, during operation, of thermal displacements or changed spacings of the fixtures, or of changed machining positions of the fixtures resulting from pivoting.

Clearly, the practice of adjusting a working spindle in its bearing housing is known in principle, but that relates to a single adjustment that is not changed during the operation of the machine tool, and which cannot really be used at all for compensating thermal displacements during operation.

To enable the working spindle to be adjusted in its respective bearing housing during operation, use is made of external energy, for example in the form of a positioning motor, via which the alignment of a working spindle in its bearing housing can be changed at any instant.

On the other hand, however, the spindle unit according to the invention can also be used to realize small, but very rapid, movements of the working spindle. The repositioning unit provided according to the invention is, as it were, a further, very high-speed tool axis, which is located in the tool and which is superimposed on the capability for repositioning the spindle head relative to the workpiece table.

This repositioning capability can be used for rapid, short movements of the tool, such as those required, for example, in shaping angular grooves, approaching laser light barriers in the case of identification of breakage or determination of diameter or length of tools, in the return stroke for the purpose of chip clearing in the case of drilling cycles, etc. In the case of the spindle unit according to the invention, the tool can execute rapid, for example oscillating, movements relative to the bearing housing that are superimposed on the movement of the bearing housing itself. This high-speed, additional tool axis can be used whenever small, but rapid, strokes are required.

The high speed is obtained because the masses moved are appreciably less than in the case of repositioning of the entire spindle unit.

The additional tool axis can also be used for performing fine corrections in respect of the path of motion of the spindle head at the same time, i.e., during machining. Such superimposed corrective movements enable, for example, inclinations of the spindle head relative to the tool table that are dependent on the travel path, so-termed difference errors, to be compensated.

According to another aspect the working spindle is mounted so as to be repositionable in the longitudinal direction and/or tiltable in its bearing housing.

Owing to the repositioning in the longitudinal direction, working spindles can be aligned in the Z direction, whereas repositioning in the X and/or Y direction can be effected as a result of the tilting of a working spindle.

With the capability for tilting a working spindle in the bearing housing, the inventors of the present application describe a way, not hitherto known in the prior art, for setting the spacings of working spindles in relation to one another, or for repositioning working spindles. In contrast to the tilting of spindle units relative to one another, the tilting of a working spindle in its bearing housing appears to entail a whole range of problems, which might initially dissuade from use of this solution.

This is because, on the one hand, the tilting results in an angle error in the tool, although, on the basis of initial experiments by the applicant, this error can be tolerated.

On the other hand, the tilting results in an alignment error between the upper and the lower mounting, which can result in excessive stress on the bearings, such that the displacement is limited by the maximum alignment error that can be tolerated, which, in turn, depends on the service life expectation.

Experiments by the applicant have now shown, however, that these problems, which initially appear to be contrary to the solution according to the invention, can be overcome through the design details described subsequently below, such that, with the design according to the invention, it has been possible to adopt an entirely new approach to the repositioning and alignment of working spindles in relation to one another.

According to another aspect the working spindle is mounted, at its lower or upper end, in the assigned bearing housing via a first bearing that can be repositioned transversely relative to the longitudinal direction by means of a positioning motor.

In the case of this measure, it is advantageous that the tilt capability of the working spindle is realized in that the upper or the lower bearing is repositioned transversely relative to the longitudinal axis, as a result of which a displacement in the X direction and/or Y direction is obtained at the same time.

The inventors of the present application have perceived that, in the case of displacements that are not excessively large, it is possible in this manner to realize high-speed tool axes that can be repositioned relative to the bearing housing, without excessive stress on the bearings of the working spindle.

According to another aspect the working spindle is mounted, at its lower or upper end, in the assigned bearing housing via a first bearing that can be repositioned in the longitudinal direction by means of a positioning motor.

Here, it is advantageous that the adjustment capability and/or repositioning capability in the Z direction is likewise effected through a repositioning of the lower or upper bearing. It is thereby also possible for the tilting and the longitudinal repositioning to be realized in that the corresponding bearing is arranged so as to be repositionable both transversely and longitudinally.

In this way, only small masses have to be moved, as a result of which the thus realized tool axis permits high travel speeds and accelerations without the mass of the spindle unit itself being increased excessively. It is to be mentioned here that the tool axes additionally provided according to the invention, which can be used both for adjustment for the purpose of compensation, for example of thermal deflections, and as a proper tool axis, render possible only small displacements, the larger travel movements clearly continuing to be effected via the spindle head, which can be repositioned, relative to the workpiece table, in the three orthogonal axes. Thus, the smaller the additional mass for the repositioning unit provided according to the invention, the less the mobility of the "tool principal axes" is impaired.

According to still another aspect the first bearing is held in the repositioning unit, which comprises an outer sleeve, connected to the bearing housing in rotationally fixed manner, and an inner sleeve that accommodates the first bearing and can be driven via the positioning motor.

Here, it is advantageous that the repositioning unit is of a very simple mechanical structure, such that it entails only small additional masses. Moreover, the repositioning unit provided according to the invention permits transverse repositioning if the inner sleeve is mounted eccentrically and rotatably in the outer sleeve, longitudinal repositioning also being possible if the inner sleeve is mounted in the outer sleeve via a threaded connection.

Thus, a repositioning unit, consisting of an outer sleeve and an inner sleeve, can thereby effect either the transverse repositioning or, alternatively, the longitudinal repositioning. A further advantage consists in that the outer sleeve and inner sleeve can be connected to one another in a rotationally fixed manner via a clamping or locking means that can be realized in a mechanically simple manner, in order to provide for the necessary stiffness, despite the additional axes, or repositioning capabilities.

In view of the above, according to another aspect a clamping device, optionally capable of being actuated, is provided between outer sleeve and inner sleeve, in order to connect the inner sleeve to the outer sleeve, optionally in a rotationally fixed manner.

If the inner sleeve is mounted eccentrically in the outer sleeve, then the extent of the eccentricity determines the extent by which the working spindle can be repositioned relative to the bearing housing. In the case of small displacements from the "zero position", a repositioning in this case is effected, in essence, only transversely relative to the eccentricity, the repositioning in the direction of the eccentricity being negligibly small. In this way, therefore, an adjustment between two different working spindles can be effected in that one of the two working spindles is mounted in an eccentrically acting repositioning unit, while the other of the two working spindles is mounted in a repositioning unit that can be repositioned in the longitudinal direction. This renders possible an adjustment both in the Z direction and, for example, in the Y direction, i.e., in the direction of the distance between the two working spindles.

The inventors of the present application have perceived that these two repositioning capabilities are already sufficient, in the case of a double-spindle machine, to render possible compensation of the thermal deflections that impair to the greatest extent the machining accuracy and reproducibility. According to the perception of the inventors, the small deviations in the X direction can be tolerated in this case.

According to another aspect of the invention the working spindle is mounted, via the first bearing, eccentrically and rotatably in the inner sleeve, which is mounted eccentrically and rotatably in the outer sleeve.

If the two eccentricities cancel each other out in their extent, this means nothing other than that the working spindle is mounted eccentrically relative to the outer sleeve, such that no changes are required in respect of the usual activation of the new machine tool, the repositioning unit merely creating the capability, by means of the double eccentricity, of repositioning the one working spindle, predominantly in the Y direction, relative to the other working spindle, through rotation of the inner sleeve.

Further, according to still another aspect the inner sleeve is rotatably mounted in an intermediate sleeve that can be driven via a positioning motor and that is rotatably mounted in the outer sleeve.

Here, it is advantageous that the repositioning unit provides two repositioning capabilities, the one tool axis being realized by the capability of the inner sleeve to rotate in the intermediate sleeve, and the other tool axis being realized by the capability of the intermediate sleeve to rotate in the outer sleeve.

If, in this case, the inner sleeve is mounted eccentrically in the intermediate sleeve and the intermediate sleeve is mounted eccentrically in the outer sleeve, the working spindle can consequently be repositioned both in the X direction and in the Y direction, the two eccentricities, which are preferably aligned perpendicularly relative to one another, clearly overlapping one another in their action. Through appropriate rotation of both the inner sleeve and the intermediate sleeve, however, any position of the center point of the working spindle relative to the center point of the outer sleeve can be set in the X direction and Y direction, within the scope of the eccentricity.

If the inner sleeve is mounted eccentrically in the intermediate sleeve and the intermediate sleeve is mounted, via a threaded connection, in a longitudinally repositionable manner in the outer sleeve, or the inner sleeve is mounted, via a threaded connection, in a longitudinally repositionable manner in the intermediate sleeve and the intermediate sleeve is mounted eccentrically in the outer sleeve, a capability of repositioning transversely relative to the longitudinal direction is obtained at the same time as a capability of repositioning in the longitudinal direction.

Since the repositioning of the working spindle relative to the bearing housing is effected by rotatably mounted inner sleeves and, possibly, intermediate sleeves, the driving of the inner sleeve and, possibly, intermediate sleeve can be effected via a standard positioning motor, which drives the sleeves with appropriately high rotational speeds, such that, not only is a very rapid adjustment of the position of the working spindle relative to the bearing housing possible, but very high-speed tool axes are also achievable, the repositioning speed of which axes is at least in the order of magnitude of the repositioning speed of the spindle head, but which can usually be designed to be greater, owing to the lesser mass that is moved.

The already mentioned clamping device can again be provided in this case between the inner sleeve and intermediate sleeve and/or between the intermediate sleeve and outer sleeve, in order optionally to lock the different sleeves to one another, such that a single positioning motor is sufficient to rotate the inner sleeve and intermediate sleeve, if they are clamped to one another in a rotationally fixed manner, jointly relative to the outer sleeve, or to rotate the inner sleeve relative to the outer sleeve and intermediate sleeve if the latter sleeves are clamped to one another in a rotationally fixed manner.

Generally, according to another aspect of the invention the working spindle is mounted, at its end that is distant from the first bearing, in the assigned bearing housing via a second bearing that is mounted to be displaceable in the longitudinal direction.

This measure is advantageous in respect of design in that, while the first bearing serves to tilt the working spindle and/or displace it longitudinally, the second bearing remains, as it were, passive, thereby rendering possible the repositioning capabilities, described above, of the first bearing.

In view of the above embodiments, the present invention also relates to a machine tool comprising at least one spindle unit according to the invention, whose bearing housing is arranged on a spindle head.

If the machine tool according to the invention has only one spindle unit according to the invention, there is then provided, via the repositioning unit, at least one additional, high-speed tool axis, which can be used, as it were actively, for machining workpieces, for example in shaping, or for correcting the path of motion of the spindle head, for example to prevent difference errors, or for compensating thermal deflections.

If the machine tool according to the invention is provided with two or more spindle units according to the invention that are fastened jointly to a spindle head, provision can be made, through appropriate combination of the repositioning units, not only for differing, high-speed tool axes, but also for a rapid adjustment of the working spindles in relation to one another.

Further advantages are disclosed by the description and the appended drawing.

It is understood that the aforementioned features and those yet to be explained in the following can be applied, not only in the respectively stated combinations, but also in other combinations or singly, without departure from the scope of the present invention.

BRIEF DESCRIPTION OF THE DRAWINGS

Exemplary embodiments of the invention are represented in the drawing and explained more fully in the following description. In the drawing:

FIG. 4 shows a schematically represented top view of a repositioning unit, which can tilt a working spindle and reposition it longitudinally.

DESCRIPTION OF A PREFERRED EMBODIMENT

Figure 1:
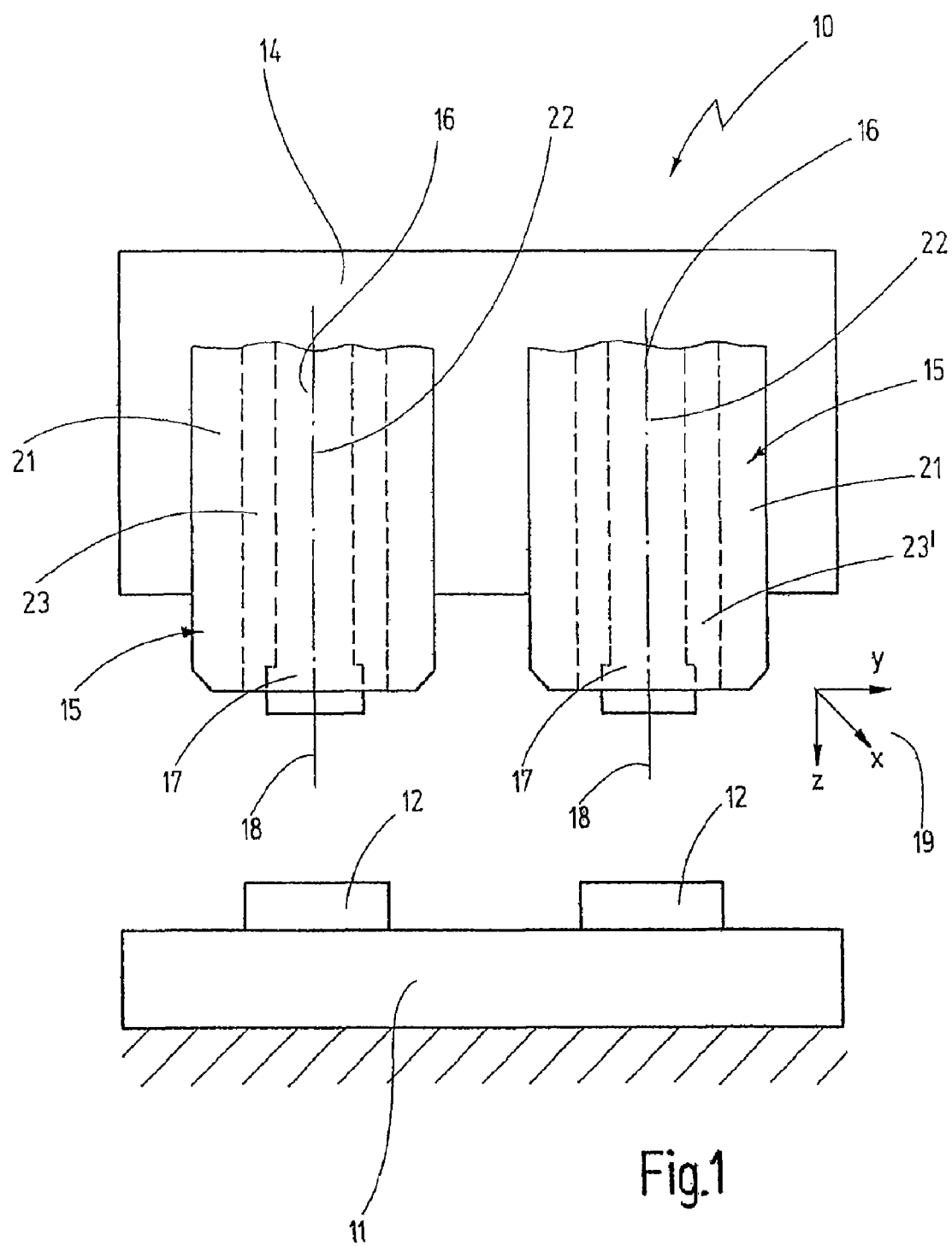
FIG. 1 shows a schematic front view of a new machine tool comprising two new spindle units.

In FIG. 1, 10 denotes a machine tool, which is shown in a schematic and sectional front view. The representation of FIG. 1 is not true to scale.

The machine tool 10 has a workpiece table 11, on which are clamped two workpieces 12 that are to be machined by means of the machine tool 10.

Further provided is a spindle head 14, on which there are provided two spindle units 15, 15', in each of which there is mounted a working spindle 16 having, at its lower end, a receiver 17 for tools 18, by means of which the workpieces 12 are machined.

The spindle head 14 is movable relative to the workpiece table 11 in three orthogonal axes, as represented by the coordinate system X/Y/Z denoted by 19. In this way, it is possible for the two workpieces 12 to be machined synchronously, with identical machining operations being performed on each workpiece. In order to provide for sufficient accuracy and reproducibility, not only between two workpieces 12 to be machined simultaneously, but also between workpieces 12 to be machined in succession, the working spindles 16 can be adjusted automatically relative to one another when in operation.

For this purpose, each spindle unit 15 has a bearing housing 21, which is fastened to the spindle head 14 and in which the respective working spindle 16 is mounted so as to be rotatable about its longitudinal axis 22. Respectively provided between the working spindle 16 and the bearing housing 21 is a repositioning unit 23, 23', via which the working spindle 16 can be tilted and/or repositioned longitudinally relative to the bearing housing 21, as is now explained in greater detail with reference to FIG. 2.

Figure 2:
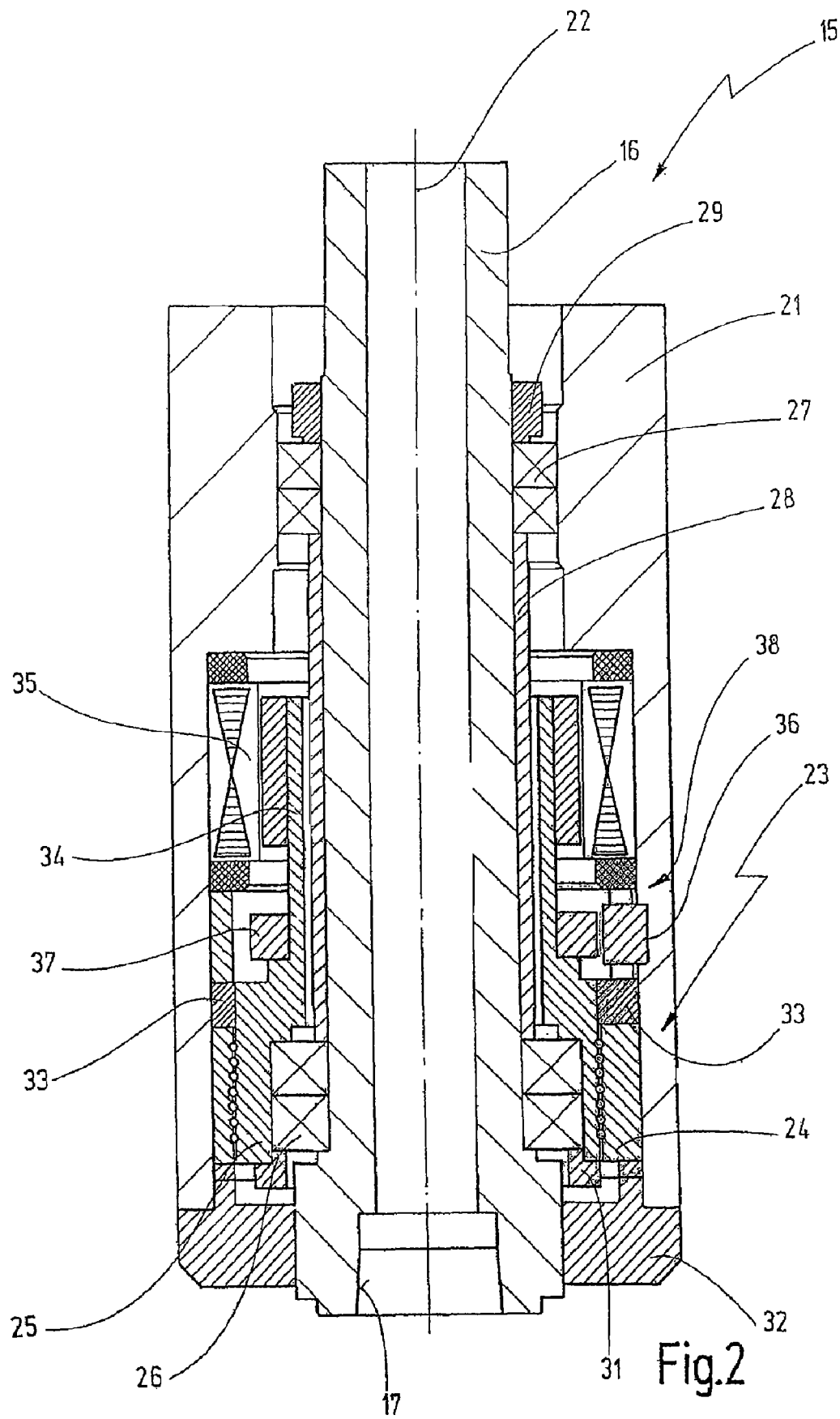
FIG. 2 shows a schematic longitudinal section through one of the spindle units from FIG. 1.

FIG. 2 shows a longitudinal section through the spindle unit 15 from FIG. 1, the representation here, likewise, being purely schematic and not true to scale.

The repositioning unit 23 comprises an outer sleeve 24 mounted in a rotationally fixed manner in the bearing housing 21, as well as an inner sleeve 25, which is rotatable relative to the outer sleeve 24 and in which the working spindle 16 is mounted, via a first, lower bearing 26, so as to be rotatable, but fixed in the longitudinal direction. The working spindle 16 is mounted in a longitudinally displaceable manner in the bearing housing 21 by means of a second, upper bearing 27.

A sleeve 28 extends between the lower bearing 26 and the upper bearing 27. The upper and the lower bearing 27 and the sleeve 28 are tensioned to one another by a shaft nut 29 acting upon the upper bearing 27, such that the working spindle 16 is mounted rotatably, but non-displaceably, in the inner sleeve 25.

For this purpose, the first bearing 26 is held in the inner sleeve 25, and the outer sleeve 24 is held in the bearing housing 21, by means of a first flange 31 and a second flange 32, respectively.

Provided between the outer sleeve 24 and the inner sleeve 25 is a clamping device, merely outlined at 33, by means of which the inner sleeve 25 can be prevented from rotating relative to the outer sleeve 24, since it is connected to the outer sleeve 24 in a rotationally fixed manner.

When the clamping device 33 is slackened, however, the inner sleeve 25 can be rotated relative to the outer sleeve 24. For this purpose, there is provided on the inner sleeve 25 a tubular socket 34, which extends centrally relative to the working spindle 16 and acting upon which is a positioning motor 35 that can in sections rotate the inner sleeve 25 or, alternatively, can also put the inner sleeve 25 into rotation relative to the outer sleeve 24.

To enable the relative position between the inner sleeve 25 and the outer sleeve 24 to be checked metrologically, a sensor 36 is provided in the bearing housing 21, which sensor, together with a transducer ring 37 connected in a rotationally fixed manner to the inner sleeve, constitutes an angular position measuring system 38.

In the case of the configuration shown in FIG. 2, the inner sleeve 25 is mounted eccentrically in the outer sleeve 24, while the working spindle 16, in turn, is mounted eccentrically in the inner sleeve 25. If the inner sleeve 25 is rotated so that the two eccentricities are just opposite one another, the longitudinal axis 22 of the working spindle 16 coincides with the central axis of the outer sleeve 24.

Slight rotation of the inner sleeve 25 relative to the outer sleeve 24 now causes the longitudinal axis 22 of the working spindle 16 to move substantially in the Y direction only, the working spindle 16 being tilted. The slight repositioning in the X direction, resulting from the eccentric circular motion, can be disregarded, provided that the repositioning about the zero position is only, for example, ±10°.

Figure 3:
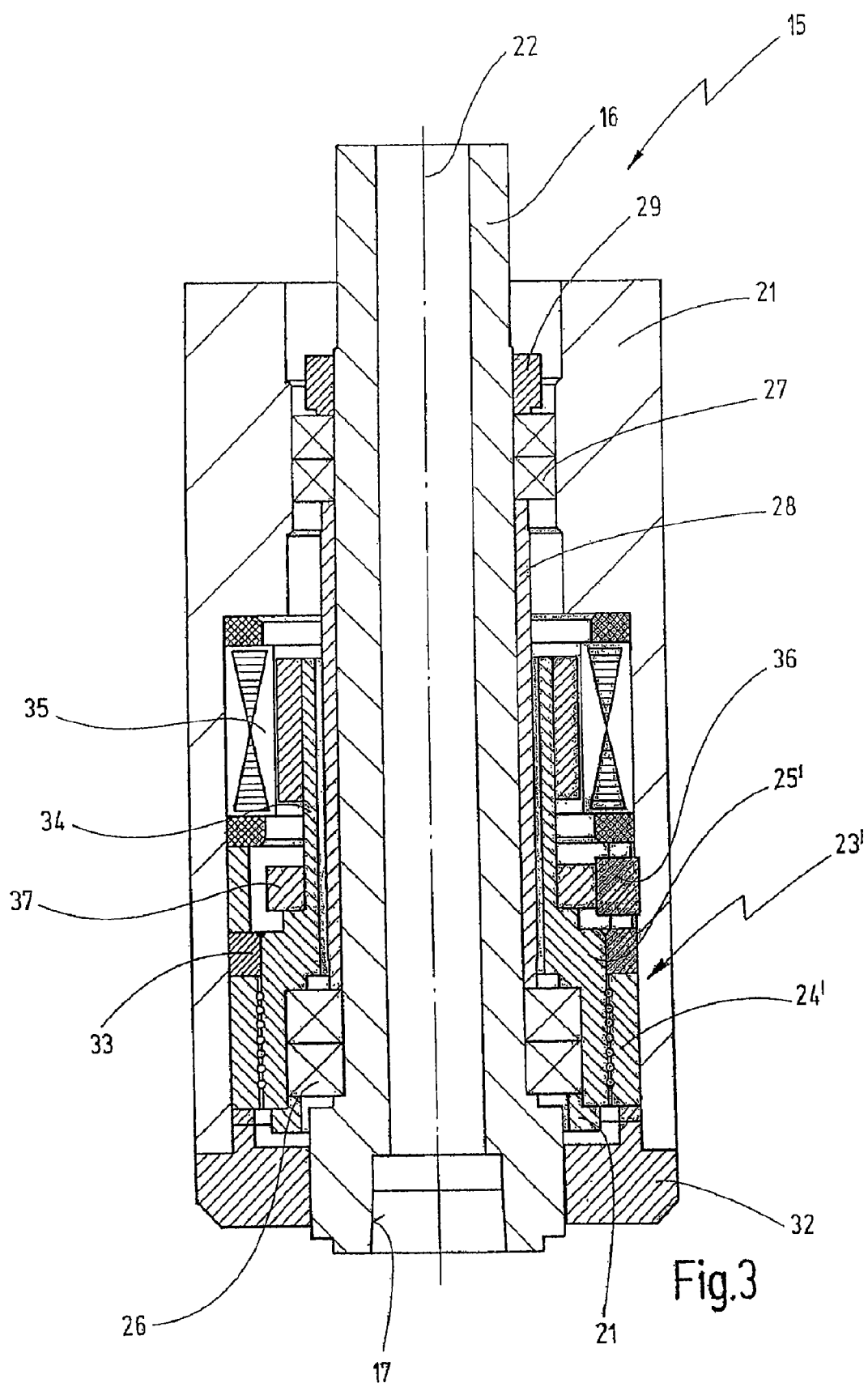
FIG. 3 shows a representation as in FIG. 2, but with a repositioning unit acting in another direction.

In the case of the spindle unit 15' represented in FIG. 3, the structure is almost identical to the spindle unit 15 from FIG. 2, the repositioning unit 23' again consisting of an outer sleeve 24' fixedly mounted in the bearing housing 21 and of an inner sleeve 25' that is rotatable relative to the outer sleeve 24', but with the inner sleeve 25' being arranged centrally in relation to the outer sleeve 24', the working spindle 16 also being mounted centrally in the inner sleeve 25'.

A threaded connection is provided between the inner sleeve 25' and the outer sleeve 24', such that, upon the inner sleeve 25' being rotated relative to the outer sleeve 24', the inner sleeve 25', and thereby the working spindle 16, is repositioned in the Z direction.

Figure 5:
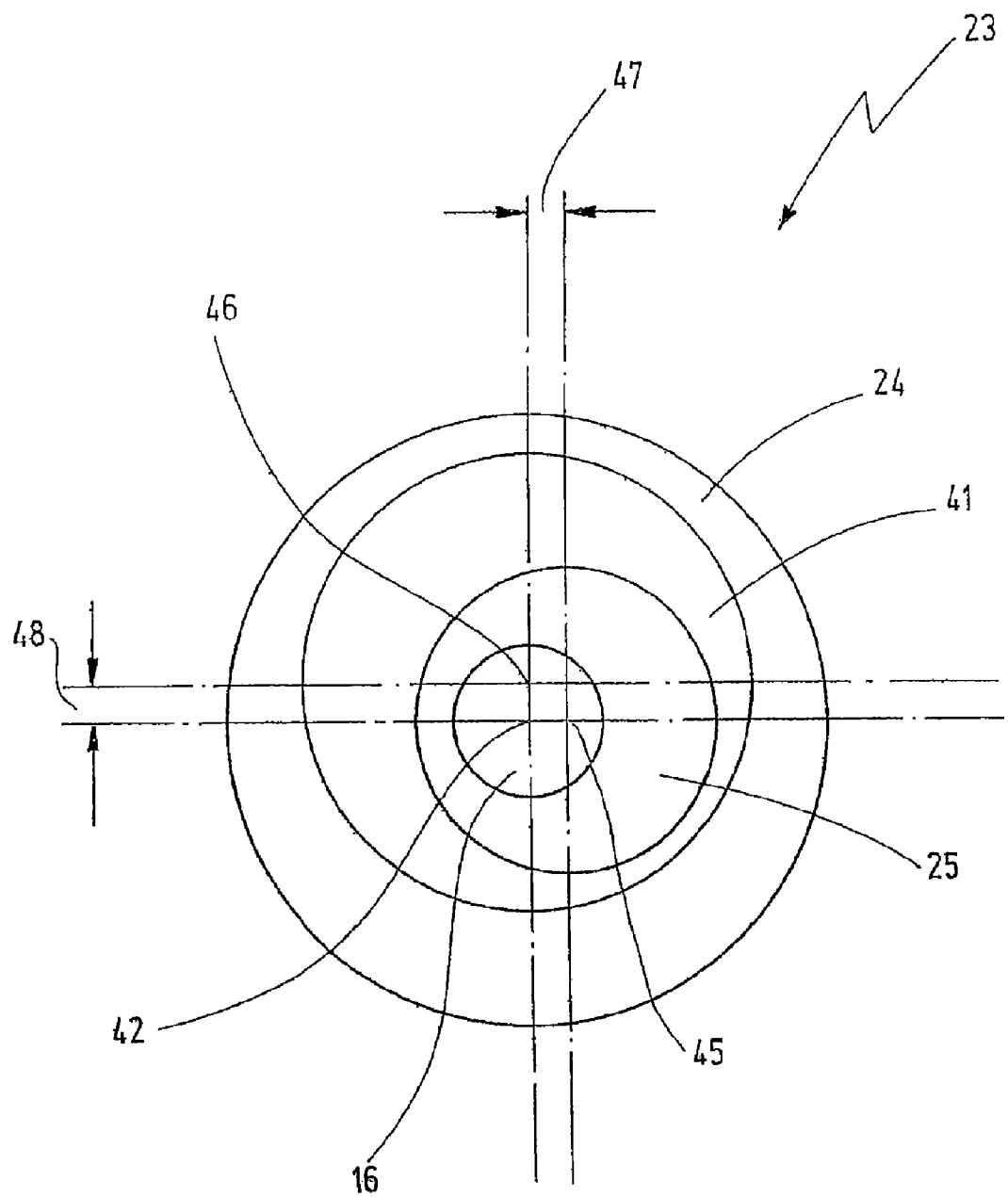
FIG. 5 shows a representation as in FIG. 4, but with a working spindle that can be tilted in two directions.
Figure 5:
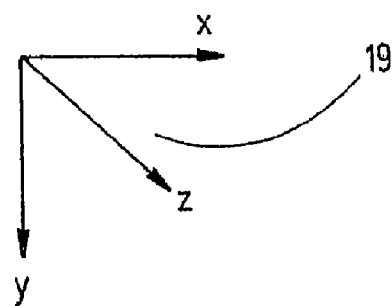

Whereas, in FIGS. 2 and 3, the repositioning units 23, 23' respectively provide only one high-speed tool axis, FIGS. 4 and 5 show repositioning units 23 that show overlaying of two repositioning capabilities, through use of an additional, intermediate sleeve 41.

In FIG. 4, the intermediate sleeve 41 is mounted centrally in the outer sleeve 24, a threaded connection being provided between the outer sleeve 24 and the intermediate sleeve 41, which threaded connection, as in the case of the exemplary embodiment according to FIG. 3, renders possible longitudinal repositioning, i.e., repositioning in the Z direction. Owing to the inner sleeve 25 being arranged eccentrically in the intermediate sleeve 41, the repositioning unit 23 in FIG. 4 further provides for tilting of the working spindle 16, which, in essence, upon the intermediate sleeve 25 being rotated slightly relative to the situation shown in FIG. 4, causes the center point of the working spindle 16 indicated at 42 to be displaced in the Y direction. The working spindle 16 also becomes tilted in the X direction only upon the inner sleeve 25 being rotated to a greater extent relative to the outer sleeve 24. The center point of the intermediate sleeve 25 is indicated at 43, 44 showing the extent of the eccentricity.

In the case of the exemplary embodiment shown in FIG. 5, the intermediate sleeve 41 is also mounted eccentrically in the outer sleeve 24. The center point 45 of the inner sleeve 25 is displaced in the X direction relative to the center point 42 of the outer sleeve 24, while the center point 46 of the intermediate sleeve 41 is displaced in the Y direction, such that the eccentricities indicated at 47 and 48, which are perpendicular to one another, are produced. Clearly, as soon as the intermediate sleeve 41 and/or the inner sleeve 25 is/are rotated relative to the outer sleeve 24, the position of the center points 45 and 46 relative to the center point 42 changes. In other words, the longitudinal axis 22 of the working spindle 16 is displaced in both the X direction and in the Y direction relative to the "original" position at 42.

In this way, the repositioning unit 23 from FIG. 5 can reposition the longitudinal axis 22 of the working spindle 16, and thereby the tool carried by the working spindle 16, in the X/Y plane, which can be used both as a high-speed tool axis and for adjusting the working spindle 16 relative to another working spindle.

Clearly, it is also possible for the repositioning capabilities according to FIGS. 4 and 5 to be combined with each other, i.e., for a total of two intermediate sleeves 41 to be provided, such that the working spindle 16 can be repositioned relative to the outer sleeve 24 in all three spatial coordinates.

In the case of the exemplary embodiments according to FIGS. 4 and 5, the intermediate sleeve 41 can either be provided with its own positioning motor, it being also possible, by means of a clamping device, to provide for mutual locking between the outer sleeve and the intermediate sleeve, on the one hand, and the intermediate sleeve and the inner sleeve, on the other hand, in order to drive only the inner sleeve and, in so doing, to reposition either the inner sleeve relative to the intermediate sleeve or to reposition the intermediate sleeve locked to the inner sleeve, together with the inner sleeve, relative to the outer sleeve.

The invention claimed is:

1. A spindle unit comprising
    a working spindle,
    a bearing housing, said working spindle being mounted, so as to be rotatable about its longitudinal axis, in its own bearing housing,
    a receiver for tools for machining workpieces, said receiver being provided in the working spindle, and
    a repositioning unit, in order for the working spindle to be repositioned automatically and controllably in relation to the bearing housing when in operation,
    wherein the working spindle is mounted so as to be tiltable in its bearing housing,
    wherein the working spindle is mounted, at its lower or upper end, in the assigned bearing housing via a first bearing that can be repositioned transversely relative to the longitudinal direction by means of a positioning motor, and
    wherein the first bearing is held in the repositioning unit, which comprises an outer sleeve, connected to the bearing housing in rotationally fixed manner, and an inner sleeve that accommodates the first bearing and can be driven via the positioning motor.

2. The spindle unit as claimed in claim 1, characterized in that the working spindle is mounted in its bearing housing so as to be repositionable in the longitudinal direction.

3. The spindle unit as claimed in claim 1, characterized in that the inner sleeve is mounted eccentrically and rotatably in the outer sleeve.

4. The spindle unit as claimed in claim 3, characterized in that the working spindle is mounted, via the first bearing, eccentrically and rotatably in the inner sleeve.

5. The spindle unit as claimed in claim 1, characterized in that the inner sleeve is mounted, via a threaded connection, in a longitudinally repositionable manner in the outer sleeve.

6. The spindle unit as claimed in claim 1, characterized in that the inner sleeve is rotatably mounted in an intermediate sleeve that can be driven via a positioning motor and that is rotatably mounted in the outer sleeve.

7. The spindle unit as claimed in claim 6, characterized in that the inner sleeve is mounted eccentrically in the intermediate sleeve and the intermediate sleeve is mounted eccentrically in the outer sleeve.

8. The spindle unit as claimed in claim 6, characterized in that the inner sleeve is mounted eccentrically in the intermediate sleeve and the intermediate sleeve is mounted, via a threaded connection, in a longitudinally repositionable manner in the outer sleeve.

9. The spindle unit as claimed in claim 6, characterized in that the inner sleeve is mounted, via a threaded connection, in a longitudinally repositionable manner in the intermediate sleeve and the intermediate sleeve is mounted eccentrically in the outer sleeve.

10. The spindle unit as claimed in claim 1, characterized in that the working spindle is mounted, at its end that is distant from the first bearing, in the assigned bearing housing via a second bearing that is mounted to be displaceable in the longitudinal direction.

11. The spindle unit as claimed in claim 1, characterized in that a clamping device, optionally capable of being actuated, is provided between outer sleeve and inner sleeve, and/or between an intermediate sleeve and inner sleeve, in order to connect the inner sleeve and/or the intermediate sleeve to the outer sleeve in a rotationally fixed manner, or to connect the inner sleeve to the intermediate sleeve in a rotationally fixed manner.

12. A spindle unit comprising
    a working spindle,
    a bearing housing, said working spindle being mounted, so as to be rotatable about its longitudinal axis, in its own bearing housing,
    a receiver for tools for machining workpieces, said receiver being provided in the working spindle, and
    a repositioning unit, in order for the working spindle to be repositioned automatically and controllably in relation to the bearing housing when in operation,
    wherein the working spindle is mounted, at its lower or upper end, in the assigned bearing housing via a first bearing that can be repositioned transversely relative to the longitudinal direction by means of a positioning motor, and
    wherein the first bearing is held in the repositioning unit, which comprises an outer sleeve, connected to the bearing housing in rotationally fixed manner, and an inner sleeve that accommodates the first bearing and can be driven via the positioning motor.

13. A machine tool comprising at least one spindle unit as claimed in claim 1, characterized in that the bearing housing or bearing housings is or are arranged on a common spindle head.

14. The spindle unit as claimed in claim 2, characterized in that the working spindle is mounted, at its lower or upper end, in the assigned bearing housing via a first bearing that can be repositioned transversely relative to the longitudinal direction by means of a positioning motor.

15. The spindle unit as claimed in claim 2, characterized in that the working spindle is mounted, at its lower or upper end, in the assigned bearing housing via a first bearing that can be repositioned in the longitudinal direction by means of a positioning motor.

16. The spindle unit as claimed in claim 1, characterized in that the working spindle is mounted, at its end that is distant from the first bearing, in the assigned bearing housing via a second bearing that is mounted to be displaceable in the longitudinal direction.

17. The spindle unit as claimed in claim 10, characterized in that a clamping device, optionally capable of being actuated, is provided between outer sleeve and inner sleeve, and/or between an intermediate sleeve and inner sleeve, in order to connect the inner sleeve and/or the intermediate sleeve to the outer sleeve in a rotationally fixed manner, or to connect the inner sleeve to the intermediate sleeve in a rotationally fixed manner.

18. A machine tool comprising at least one spindle unit as claimed in claim 12, characterized in that the bearing housing or bearing housings is or are arranged on a common spindle head.

19. A spindle unit comprising
- a working spindle,
- a bearing housing, said working spindle being mounted, so as to be rotatable about its longitudinal axis, in its own bearing housing,
- a receiver for tools for machining workpieces, said receiver being provided in the working spindle, and
- a repositioning unit, in order for the working spindle to be repositioned automatically and controllably in relation to the bearing housing when in operation,
- wherein the working spindle is mounted so as to be tiltable in its bearing housing, and
- wherein the working spindle is mounted, at its lower or upper end, in the assigned bearing housing via a first bearing that can be repositioned in the longitudinal direction by means of a positioning motor.

* * * * *